Patented Jan. 30, 1940

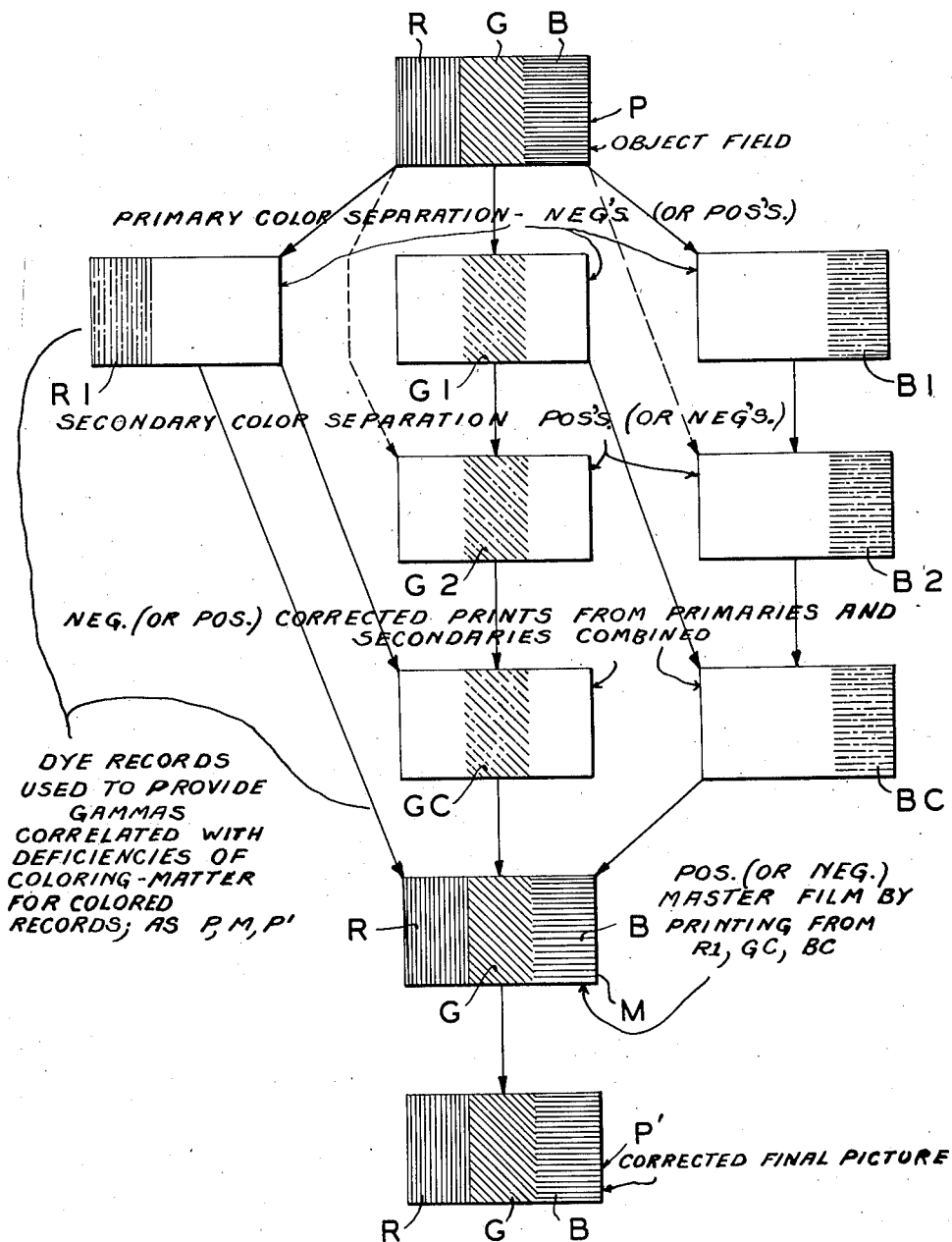

2,188,325

UNITED STATES PATENT OFFICE 2,188,325

COLOR PHOTOGRAPHY

Eastman A. Weaver, Winchester, Mass., assignor to Comstock & Wescott, Inc., Cambridge, Mass., a corporation of Massachusetts Application March 17, 1936, Serial No. 69,272

4 Claims. (Cl. 95—2)

This invention relates to color photography and more particularly to color photography of the subtractive type involving the use of a subtractive film which records the different color aspects of the scene throughout the same area, although in certain aspects the invention may be utilized with other types of film.

To make accurate three-color subtractive photographs without retouching, each of the three coloring-matters constituting the photograph should absorb one-third of the spectrum without appreciable absorption of the remaining two-thirds. For example, an ideal cyan (minus red) would absorb red light but neither green nor blue, an ideal magenta (minus green) would absorb green light but neither red nor blue, and an ideal yellow (minus blue) would absorb blue light but neither red nor green. However, the available coloring-matters do not in general meet these ideal requirements. While there are yellow dyes which absorb little if any light other than blue, the best available magenta color absorbs considerable blue light as well as green and the best available cyan absorbs both green and blue light as well as red. Indeed I have found that one of the best non-fugitive cyan coloring-matters for absorbing red light has approximately 50% as much absorption of green light and approximately 25% as much absorption of blue light; and one of the best non-fugitive magentas for absorbing green light has approximately 50% as much absorption of blue light. Thus the best available cyan coloring-matter may be regarded as a mixture of ideal cyan and 50% as much ideal magenta and 25% as much ideal yellow, and the best available magenta as including 50% as much ideal yellow.

These improper absorptivities alter the proportions in which the three colors must be used in order to obtain neutral balance, that is colorless whites, grays and blacks. For example if the cyan acts as though it contained 50% ideal magenta, the theoretical amount of magenta has to be reduced 50%; and if each of the cyan and magenta pigments contributes 25% of the necessary yellow effect the theoretical amount of yellow is also to be reduced 50%. While this method produces neutral balance in the whites, grays and blacks of the picture, the colored portions, especially the green portions, are dull.

The principal object of the present invention is to correct for the inaccuracies of available coloring-matters and to counteract the aforesaid dulling effect on the colored portions of the picture. Other objects will appear from the following description and the appended claims.

As disclosed in my copending application Serial No. 35,323, filed August 8, 1935, and Serial No. 70,048 filed March 21, 1936, effective ways to attain the aforesaid objects comprises making auxiliary prints or records of a color photograph and then using these prints, in combination with each other or in combination with the original photograph or both, in differential printing operations, to form a corrected color photograph or color reproduction. However, these processes depend upon development of certain of the records to a predetermined contrast or gamma, and, owing to variations in emulsion thickness, air oxidation of the developer, removal of reaction-products due to variations in agitation of the developer, etc., it is somewhat difficult to regulate the gamma with precision and uniformity and to obtain the various densities correctly over the whole picture area. Further object of the present invention, therefore, is to avoid the effect of the aforesaid variable factors, thereby facilitating the gamma and density control. To this end I propose to form the aforesaid prints by a process which affords with certainty an approximately straight-line characteristic substantially irrespective of the aforesaid variable factors, as for example by making the prints in the form of dyed reliefs whose photographic effect, as well known, is substantially determined by the varying thickness or contour of the colloid forming the relief apart of course from the amount and character of the dyes used, such reliefs presenting possibilities of light absorption control, including control of contrast values, which can not be obtained with conventional silver records. The gamma may then be controlled accurately and easily merely by regulating the amount of dye absorbed by the relief images, as by varying the dye concentration, the acidity of the dye solution, etc.

While variations in dyeing would be substantially as objectionable as the aforesaid variable factors in developing, dye variations can be avoided more easily; indeed one of the chief causes of variations in development (air oxidation) does not affect the dyeing at all. The present invention has the further advantage of permitting development to completion (which tends to even out any inequalities of development over the film area), the effective gamma being determined subsequently by degree of dyeing; whereas gamma regulation in developing of course does not permit development to completion. Furthermore, variations in dyeing, if they do occur, can be corrected merely by re-dyeing in an altered solution instead of by making a wholly new relief-print; or a print can be given successively different contrasts for use in different processes merely by re-dyeing.

A further advantage of dyed relief corrective films for certain uses is that they may be given any desired color, and may therefore be combined in two or more colors to give separate corrections at a single printing on color-film such as monopack. Such printings should of course be made by projection in order to print from two or three films at once with accurate register and sharp definition. This subject is further developed in my co-pending application, Serial No. 70,048, above referred to.

For the purpose of illustration a typical embodiment of the invention is shown in the accompanying drawing in which the figure is a diagram of a preferred process.

In the figure P represents a picture of a red band R, a green band G and a blue band B; and P' represents a reproduction of the picture with the aforesaid corrections for the imperfections of the coloring-matters used in each stage of the process including, if desired, the imperfections of the coloring-matters employed in the original picture P. For example, the picture P may be a transparency of the monopack type in which the three-color aspects are recorded respectively in three different layers or strata of emulsion on a single support.

According to the process illustrated in the figure I may make a set of color separation prints R1, G1 and B1 of the red, green and blue aspects respectively from the color picture P by successively printing from the picture with red, green and blue light on three separate films respectively.

I may also make a set of prints G2 and B2 of the green and blue aspects from the prints G1 and B1 respectively or directly from the original picture P or one in one way and the other in the other way. In the latter case the print B1 is unnecessary and may be omitted. A corrected print GC of the green aspect is then made by printing through R1 and G2 in superposition and, if a correction in the blue aspect is also desired, a corrected print BC of the blue aspect is made by printing through G1 and B2 in superposition. A master film M may then be formed by successively printing (in registry on a single film of the monopack type for example) from R1, GC and BC respectively or, if no correction in the blue aspect is desired, from R1, GC and B1. If the master film be of the monopack type each of these three printings must of course be effected with light of wave length appropriate to the sensitivity of the stratum in which the corresponding image is to be formed. The master film may be used as the final product of the process or it may be used as a stage product to form the final product P'. If the latter is also of the monopack type it may of course be printed directly from M with white light. When M is to be used as the final picture, only a two-fold correction need be made for imperfections in coloring-matter, one for the coloring-matter employed in the original picture and one for the coloring-matter employed in the film M. When M is to be used as a corrected master to form the final picture P then it should have a three-fold correction for the imperfections of coloring-matters including those employed in P', that is, M should be over-corrected not only to counteract the defects in itself and the picture P from which it is made but also the defects of the coloring-matter to be used in the final picture P' to be made from it.

The two images which are superposed to print each corrected image should be opposites, that is, one negative and one positive. Thus, referring to the figure, if R1 is negative, G2 should be positive and vice versa, and if G1 is negative B2 should be positive. By way of example R1, G1 and B1 may be negative and B2 and G2 may be positives. Moreover as fully explained in my copending application Serial No. 35,323, the gamma of certain of the prints must be correlated with the absorption characteristics of the coloring-matter to be corrected for. In most cases it is also preferable to have the contrast of one of the superposed images (R1 and G2 for example) greater than that of the other.

In three-color processes the coloring-matters are ordinarily balanced so that equal superposed printings of the three produce neutral shades. This condition of neutral balance is attained when the sum of the red-light gammas of the three-coloring matters, the sum of the green-light gammas and the sum of the blue-light gammas are equal to each other. In correcting for deficiency of coloring-matters according to this invention this balanced condition is maintained.

In some cases it is preferable to make both primary and secondary prints (e. g. R1 and G2), which are to be superposed in making a corrected print (e. g. GC), directly from the original (e. g. P), developing one by reversal so that one is a negative and the other is a positive. For example, when using film which shrinks and expands, images may be more easily caused to register if the production of the two involves the same number of wet processes respectively, whereas if R1 be made directly from P and G2 be made indirectly through the medium of G1 then the size of G2 may differ from that of R1 because of the shrinkage of G1 in addition to that of itself (G2).

According to this invention the positives G2 and B2 and the corrective prints GC and BC are preferably made in the form of dyed reliefs. The negatives R1, G1 and B1 may also comprise dyed reliefs. After the images are developed and etched in hot water in well-known manner they are dyed with any suitable dye which absorbs all of the actinic light effective in printing, preferably orange, red-orange, red or black, to the extent required to obtain the desired effective gamma as aforesaid. The dye should of course penetrate all the colloid of the relief evenly, as do most acid dyes; many direct or cotton dyestuffs, on the other hand, collect at the gelatine surface, and hence are less suitable.

Since the dyeing power of an acid dye in a solution is governed largely by its acidity, I prefer to stabilize acidity by adding a buffer, or by using a high concentration of weak acid rather than a low concentration of strong acid.

Complete removal of adhering dye solution from the relief surface without washing of dye out of the body of the relief is of course essential. Rinsing in acidified water slightly more acid than the dye solution, followed by a compressed-air blow-off is a satisfactory method for effecting the necessary cleaning.

It should be understood that the present disclosure is for the purpose of illustration only and that this invention includes all modifications and equivalents which fall within the scope of the appended claims.

I claim:

1. The method of producing a color photograph corrected for coloring-matter deficiencies, involving the use for the reproduction of a first color aspect, of coloring-matter deficient because having improper absorptivity for light which should only be absorbed by coloring-matter corresponding to a second aspect, which method comprises forming a color separation record of said first aspect, forming a color-separation record of said second aspect, one record comprising a negative and the other a positive and one record having greater contrast than the other, and forming with said records a corrected record of said second aspect, at least one of said records comprising a dyed colloid record whose gamma is determined by its dye content, and the ratio of the contrast values of said first and said second record being proportionate to said improper absorptivity.

2. The method of producing a color photograph corrected for coloring-matter deficiencies, involving the use for the reproduction of a first color aspect, of coloring-matter deficient because having improper absorptivity for light which should only be absorbed by coloring-matter corresponding to a second aspect, which method comprises forming a color separation record of said first aspect, forming a color-separation record of said second aspect, one record comprising a negative and the other a positive and one record having greater contrast than the other, and forming with said records a corrected record of said second aspect, at least one of said records comprising a dyed colloid relief whose gamma is determined by its dye content, and the ratio of the contrast values of said first and said second record being proportionate to said improper absorptivity.

3. The method of producing a color photograph corrected for coloring-matter deficiencies, involving the use for the reproduction of a first color aspect, of coloring-matter deficient because having improper absorptivity for light which should only be absorbed by coloring-matter corresponding to a second aspect, which method comprises forming a color separation record of said first aspect, forming a color-separation record of said second aspect, one record comprising a negative and the other a positive and one record having greater contrast than the other, and forming with said records a corrected record of said second aspect, at least one of said records comprising a dyed colloid relief whose gamma is determined by its dye content and which has an approximately straight characteristic curve, and the ratio of the contrast values of said first and said second record being proportionate to said improper absorptivity.

4. The method of producing a color photograph corrected for coloring-matter deficiencies, involving the use for the reproduction of a first color aspect, of coloring-matter deficient because having improper absorptivity for light which should only be absorbed by coloring-matter corresponding to a second aspect, which method comprises forming a color separation record of said first aspect, forming a color-separation record of said second aspect, one record comprising a negative and the other a positive and one record having greater contrast than the other, forming with said records a corrective record of said second aspect and forming with said corrective record a corrected color photograph incorporating said aspects, at least one of said records comprising a dyed colloid relief whose gamma is determined by its dye content, and the ratio of the contrast values of said first and said second record being proportionate to said improper absorptivity.

EASTMAN A. WEAVER.